Jan. 28, 1947.    G. A. LYON    2,414,825
WHEEL STRUCTURE
Filed June 2, 1943    2 Sheets-Sheet 1
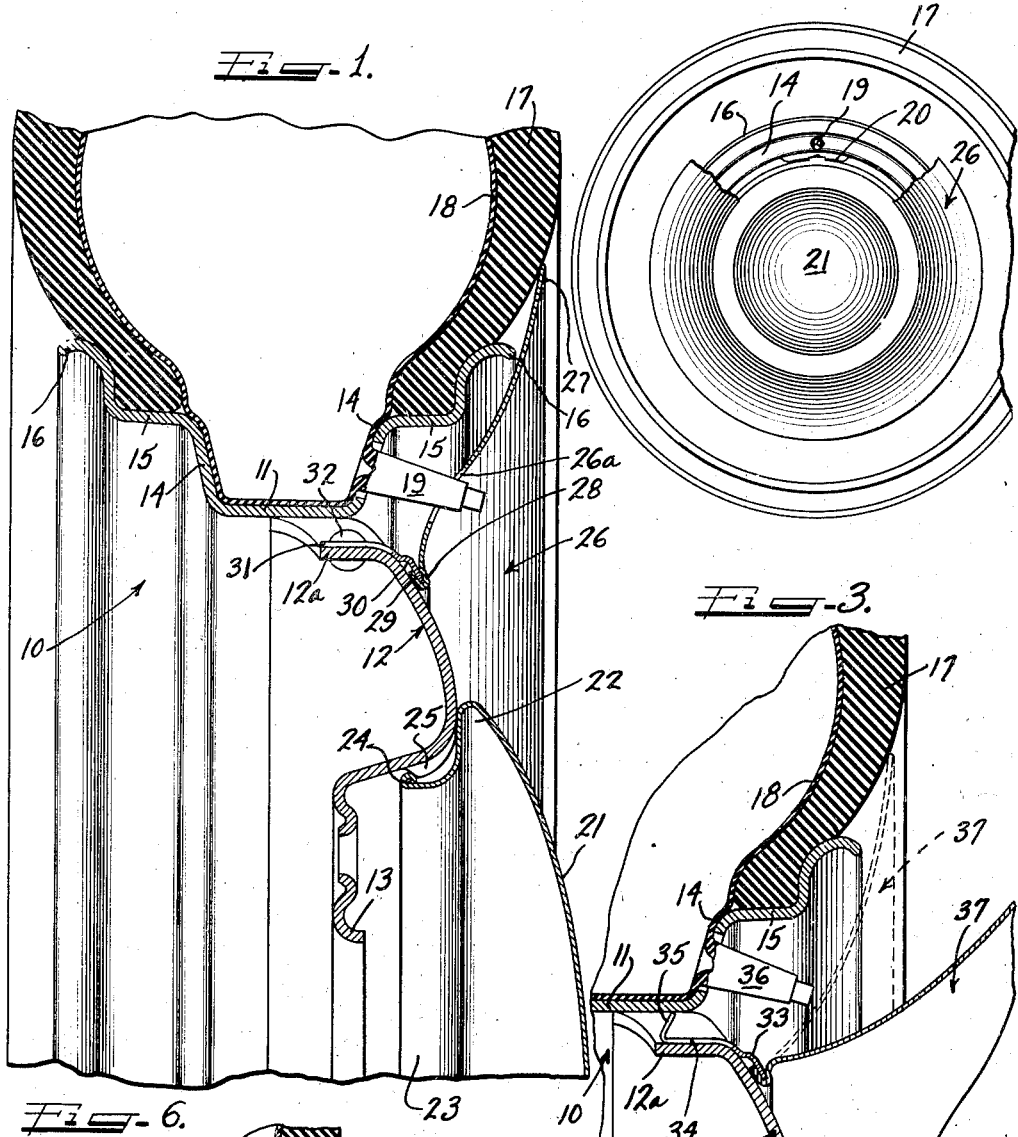
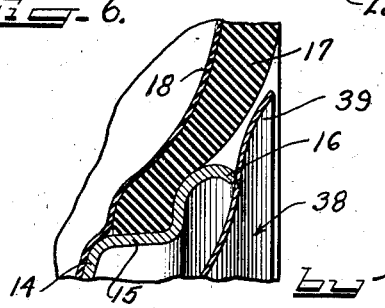
Inventor
GEORGE ALBERT LYON.
by Charles W. Hills
Attys.

Jan. 28, 1947.    G. A. LYON    2,414,825
WHEEL STRUCTURE
Filed June 2, 1943    2 Sheets-Sheet 2

Inventor
GEORGE ALBERT LYON.
by Charles W. Hills Attys.

Patented Jan. 28, 1947

2,414,825

UNITED STATES PATENT OFFICE 2,414,825

WHEEL STRUCTURE

George Albert Lyon, Allenhurst, N. J.

Application June 2, 1943, Serial No. 489,315

2 Claims. (Cl. 301—37)

This invention relates to an improved wheel structure and is directed more particularly to an improved cover assembly therefor.

It is an important object of the invention to provide for a cover assembly an improved retaining structure.

Still another object of the invention is to provide for a wheel assembly, an improved retaining structure whereby the cover is maintained securely upon the wheel structure but is quickly and easily removed therefrom and replaced thereon when desired.

In accordance with the general features of the invention there is provided herein, for a wheel structure, a cover assembly including an outer annular part arranged to extend radially outwardly over the outer side of the tire rim of a wheel structure and radially inwardly over the radially outer portion of the body part thereof, said cover presenting a radially inward, gradually axially inward curvature to constitute in effect a part of the side wall of a tire in the tire rim to give the appearance of being a portion thereof and to appear as a massive white side wall of a tire when colored white, this cover being constructed from resiliently flexible, self sustaining, form retaining sheet material such as synthetic plastic, or the like, whereby it may be flexed axially outwardly away from the tire rim to provide for servicing of appurtenances of the tire rim such as a tire valve stem or wheel balancing weights which might be secured thereto and, when the flexing pressures are released, will, of itself, revert to the initial, intended position on the wheel structure.

In accordance with still other general features of my invention there is provided herein a cover member of the above character in the form of an annulus, and having the inner peripheral margin thereof formed to provide a substantially radially outwardly axially inwardly extending groove arranged to receive a retaining flange suitably secured to the body part of the wheel structure, the cover being easily attached to or detached from the retaining means by local, temporary flexure or distortion thereof.

Still another object of the invention is to provide, for a cover of the above character, an attachment arrangement with the wheel structure whereby axial outward flexure of the cover member will result in the bending stresses being evenly distributed throughout the radial cross-sectional depth of the cover, thus avoiding the imposition of severe, sharp bending strains on any localized part thereof.

Other objects and advantages of the invention will become apparent from the following description and accompanying drawings in which:

Figure 1 is a fragmentary cross-sectional view of a wheel structure embodying my invention;

Figure 2 is a fragmentary side elevational view of the construction of Figure 1 with parts being broken away for illustrative purposes;

Figure 3 is an enlarged fragmentary cross-sectional view of the structure shown in Figure 1 with the cover being flexed axially outwardly, the cover there shown being slightly different from that shown in Figure 1 in that it is not recessed to afford a protrusion of the valve stem therethrough when in normal position;

Figure 6 is a fragmentary cross-sectional view of a wheel structure embodying a modified form of the invention.

Figure 4:
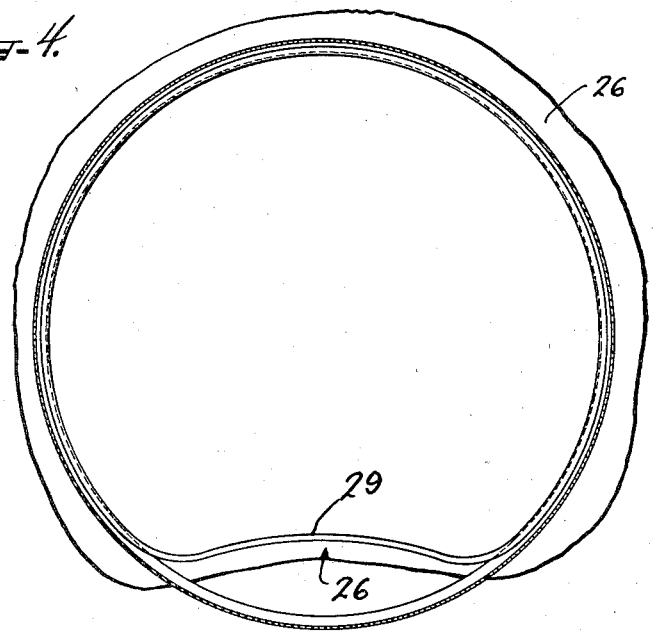
Figures 4 and 5 are fragmentary rear elevations of the construction shown in Figure 1 to illustrate the manner in which the cover member may be attached and removed from the wheel structure.

It will be understood that the embodiments shown herein are for illustrative purposes only and may be changed or modified without departing from the spirit and scope of the invention as set forth in the appended claims.

In the drawings, and particularly in Figure 1, the reference character 10 designates generally a drop center type tire rim having a base flange 11 which is secured to a central body part 12 as by riveting, welding, or the like, the central body part having a bolt-on flange 13. The tire rim 10 is further provided with opposite side flanges 14, opposite intermediate flanges 15 and opposite edge portions 16, there being shown a conventional tire 17 having an inner tube 18 and a valve stem 19 disposed between the flanges of the rim 10. As shown in the drawings one of the side flanges 14 is apertured to admit the substantially axially outwardly extending valve stem 19.

The central body part or load bearing portion of the wheel 12 is provided at its radially outer margin with an axially inwardly extending flange having depressed portions 12a spaced from the radially inner surface of the flange 11 of the tire rim thereby to provide a plurality of circumferentially spaced apertures 20 between the tire rim and the central body part 12.

The cover assembly shown herein includes a central hub cap simulating part 21 which is provided with a radially outward extremity 22 arranged to be held against the adjacent portion of the outer surface of the central body part 12 by engagement of an axially inwardly extending snap-on flange 23 thereof with the wheel structure. The snap-on flange 23 terminates in a peripheral snap-on bead 24 which is arranged to be urged axially inwardly over a plurality of humps 25 disposed on the outer surface of the central body part 12 to extend radially inwardly of the wheel structure. The diameter of the circle described by the radially inner extremity of the humps 25 is smaller than that of the circle described by the radially outward extremity of the bead 24 of the hub cap and thus, when the resilient flange 23 and its bead 24 is urged axially inwardly of the wheel structure, the bead overrides the body of the hump to rest against the axially inwardly extending face thereof to maintain the cover 21 upon the wheel structure.

The cover assembly shown herein is completed by the provision of an annular cover member 26 formed from a suitable elastically resilient, temporarily flexible, self sustaining, form retaining material such as sheet synthetic plastic or the like. As shown herein the cover is provided with the outer marginal portion 27 arranged to extend radially outwardly beyond the edge portion 16 of the tire rim to overlie the radially inner portion of the exposed side wall of the tire 17, thus to simulate a part of the side wall of the tire to give the effect of a massive tire upon a central load bearing portion of minimum dimension. The cover 26 furthermore extends radially inwardly to a point inwardly beyond the junction of the tire rim 10 and the central load bearing portion 12, the radially inner margin thereof being formed as at 28 to provide a flange 29 bent back upon the rear surface of the cover to provide a substantially obliquely extending, radially outwardly opening groove utilized as the retaining junction of the cover.

The retaining means shown herein comprises a structure having an inner portion preferably in the form of an annulus 30, the annulus comprising a radially inwardly extending flange and having a series of spaced fingers 31 which are formed to overlie the radially outer surface of the depressed portions 12a of the flange of the body part 12. The fingers 31 may be secured to the portions 12a of the flange in any suitable manner as by rivets 32.

As will be seen clearly from Figure 1, the radially inner extremity of the annular flange 30 is arranged to be disposed between the flange 29 of the cover and the outer body part thereof, thereby to provide a secure retaining engagement between the cover and the wheel structure.

The cover member 26 is further provided with an aperture 26a arranged to be disposed in registry with the tire valve stem 19 and the latter is of such a length that it normally extends or protrudes outwardly of the cover thereby to be readily available to receive the nozzle of an air hose for inflation of the tire.

It will be seen that with such a construction the cover member 26 is securely retained upon the wheel structure and that the retaining member is maintained against the development of vibration and rattle due to setting of the retaining element by virtue of the cushioning effect of the flange 29 between the flange 30 and the outer surface of the body part 12. Furthermore it will be seen that the cover member is free at the radially inner extremity thereof to flex without engaging any parts of the wheel structure which would normally tend to retard the flexure thereof and thus to develop sharp bending stresses and strains at any localized point therein. That is to say the axial outward flexure of the outer peripheral part of the cover member 26 results in flexure thereof throughout and thus fatigue of the material from which the cover is made does not set in at any localized point whereby the cover weakens and eventually breaks at that point.

Figure 5:
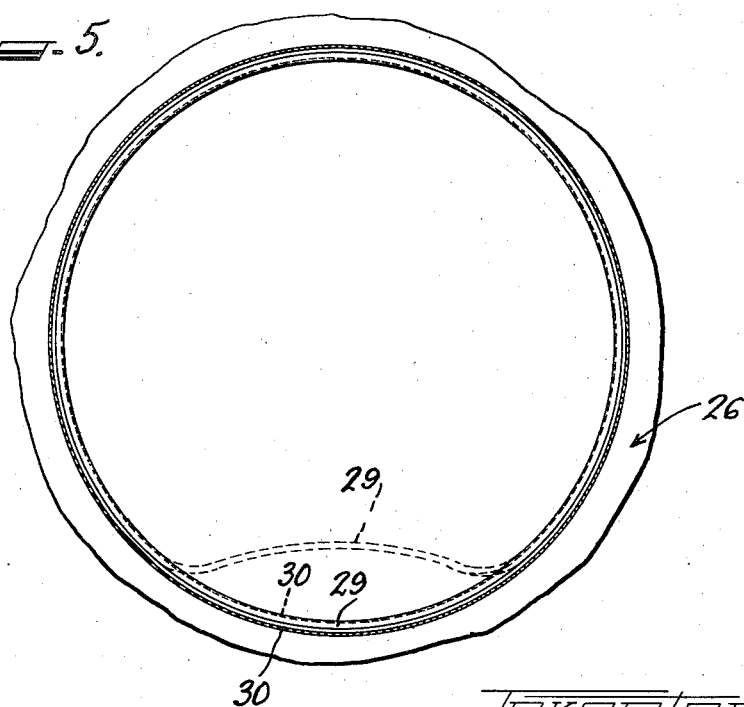

An important aspect of the above described construction is the manner in which it may be attached to and removed from the wheel structure. This factor is brought about by the elastic resiliency and the self sustaining characteristics of the cover itself. As will be seen from Figures 1, 4 and 5, the cover member 26 may be attached to the wheel structure on one side by engaging the flange 30 of the retaining member into the groove formed at the inner margin of the cover whereupon this engagement may be brought about progressively away from the point first engaged by running the fingers around the radial inner extremity of the cover. This operation is continued until a condition shown in Figure 4 is reached whereupon the cover member is bowed inwardly of the retaining means at the last remaining portion thereof. Thereafter, due to the elastic resiliency of the material from which the cover member is constructed, it will be understood that downward manual pressure on the bowed portion as shown in Figure 4, will result in the last remaining portion of the cover snapping into a position shown in Figure 5 from the position shown in full lines in Figure 4 or the position shown in dotted lines in Figure 5. Likewise it will be seen that the cover may be removed by a reversal of the operations described above.

In the construction shown in Figure 3 the arrangement is substantially similar to that shown in Figures 1 and 2, however, in this form of the invention the retaining means includes an annular retaining member including a flange 33 similar to that shown at 30 in Figure 1. The annular flange 33 is further provided with a plurality of spaced fingers 34 arranged for registry with the depressed portions 12a of the flange of the body part 12, these fingers 34 terminating in obliquely disposed, substantially axially outwardly radially outwardly extending terminal fingers 35, the ends of which are arranged to be sprung slightly radially inwardly upon inward movement of the retaining means relative to the wheel structure whereby the sharp terminal ends thereof bite into the radially inner surface of the base flange 11 of the tire rim to provide a secure attachment for the retaining member with the wheel structure. In this construction the tire valve 36 is somewhat shorter than that shown at 19 in Figure 1, whereby, when the cover 37 is in its normal position as shown in dotted lines in Figure 3, it is housed completely behind the cover to be completely concealed thereby. In this construction the tire valve stem 36 is rendered available for attachment with the nozzle of an air hose merely by flexing the cover axially outwardly as shown in solid lines in Figure 3. In this form of the invention also the cover member 37 is provided with a cross-sectional configuration of such shape and magnitude that it constitutes in effect a continuation of the side wall of the tire 17 by virtue of the radially outward extension thereof over the side wall and beyond the junction thereof with the edge portion 16 of the tire rim.

In the construction of Figure 6 the cover 38 is curled radially outwardly as at 39 to present to the side wall of the tire 17 a smooth surface so that abrasion and wear of the tire does not develop during lateral flexure thereof against the cover upon rotation of the wheel under load bearing conditions.

What I claim is:

1. In a wheel structure including a tire rim and a central load bearing member, cover retaining means comprising an annulus having a portion fixedly engaged with the load bearing member adjacent to the tire rim and an annular flange projecting generally radially inwardly substantially parallel and in spaced relation to the load bearing member, and an annular flexible cover extending in concealing relation to said tire rim and the juncture of the tire rim and load bearing member and having its radially inner margin turned under and interlocked with said annular flange of the retaining means.

2. In a wheel structure including a tire rim and a central load bearing member, a cover retaining annulus engaging the load bearing member adjacent to the tire rim, said tire rim and load bearing member having a plurality of circumferentially spaced openings therebetween, said cover retaining annulus having generally axially inwardly extending fingers projecting into said openings and fixedly secured therein, an annular generally radially inwardly extending flange on said cover retaining annulus lying in spaced substantially parallel relation to the load bearing member; and a flexible cover annulus concealingly overlying the tire rim and the juncture between the tire rim and load bearing member and having its inner edge portion turned under as an annular radially outwardly extending flange interlocked with the flange on said cover retaining annulus.

GEORGE ALBERT LYON.